United States Patent
Yasutomi et al.

(10) Patent No.: US 6,694,078 B2
(45) Date of Patent: Feb. 17, 2004

(54) OPTICAL FIBER CABLE

(75) Inventors: Tetsuya Yasutomi, Tokyo (JP); Ichiro Kobayashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/963,376

(22) Filed: Sep. 27, 2001

(65) Prior Publication Data

US 2002/0031314 A1 Mar. 14, 2002

Related U.S. Application Data

(63) Continuation-in-part of application No. PCT/JP01/04616, filed on May 31, 2001.

(51) Int. Cl.$^7$ ............................................. G02B 6/44
(52) U.S. Cl. ........................ 385/109; 385/114; 385/113
(58) Field of Search ................... 385/100–114

(56) References Cited

U.S. PATENT DOCUMENTS

| | | | | |
|---|---|---|---|---|
| 4,226,504 A | * | 10/1980 | Bellino | 385/104 |
| 4,329,018 A | * | 5/1982 | Dubost | 385/106 |
| 5,802,231 A | * | 9/1998 | Nagano et al. | 385/114 |
| 5,825,957 A | * | 10/1998 | Song | 385/113 |

FOREIGN PATENT DOCUMENTS

| | | |
|---|---|---|
| JP | 63-68613 | 5/1988 |
| JP | 5-70885 | 10/1993 |
| JP | 11-183764 | 7/1999 |

* cited by examiner

Primary Examiner—Hung N. Ngo
(74) Attorney, Agent, or Firm—Oblon, Spivak, McClelland, Maier & Neustadt, P.C.

(57) ABSTRACT

An optical fiber cable capable of absorbing water and resisting any undesirable increase of transmission loss caused by temperature variations. It has a core assembly formed by surrounding a stack of cores (1) in e.g. ribbon form by a shock absorbing member (2), at least one member (3) of high tensile strength and a sheath (4) formed from e.g. a thermoplastic resin and enclosing the core assembly and the high-tensile member (3). The shock absorbing member (2) is a strand of e.g. yarn not absorbing water, but carrying a water-absorbing resin.

6 Claims, 2 Drawing Sheets

OPTICAL FIBER CABLE

TECHNICAL FIELD

This invention relates to an improvement in an optical fiber cable having a cabled assembly of optical fiber cores.

BACKGROUND ART

A known optical fiber cable is shown in FIG. 3. The cable 35 has a core assembly formed by surrounding a plurality of ribbons of optical fiber cores 31 by a shock absorbing material 32 capable of absorbing water, too, a material 33 of high tensile strength extending along the core assembly, and a sheath 34 formed from e.g. a thermoplastic resin and enclosing the core assembly and the high-tensile material 33. The shock absorbing material 32 protects the cores 31 from external pressure. As it can absorb water, the shock absorbing material 32 absorbs any moisture that may enter the cable with the air passing through the sheath 34 and have an adverse effect on the cores 31 if, for example, the sheath 34 is broken. A strand of fiber of e.g. polyacrylate, or polyvinyl alcohol is usually used as the shock absorbing material 32. It is usually wound about the cores 31 in one or more directions.

The strand is required to be of the lowest possible density to be readily capable of absorbing water and swelling. A strand of low density, however, has a high coefficient of contraction under heat. Its contraction resulting from the high temperature of the cable is likely to cause the excessive tightening of the cores about which it is wound, and thereby bring about an increase of transmission loss.

Under these circumstances, it is an object of this invention to provide an optical fiber cable which can resist any increase of transmission loss caused by temperature variations.

DISCLOSURE OF THE INVENTION

The above objet is essentially attained by an optical fiber cable comprising a core assembly formed by surrounding an optical fiber core or cores by a shock absorbing member, at least one member of high tensile strength extending along the core assembly, and a sheath enclosing the core assembly and the high-tensile member, wherein the shock absorbing member comprises a strand of shock absorbing material not absorbing water, but carrying a water-absorbing resin.

The strand is preferably of yarn not absorbing water. Its principal component may be polypropylene, nylon or carbon yarn. The water-absorbing resin is preferably a water-absorbing polymer bonded to the shock absorbing material by an adhesive. The shock absorbing material preferably has a coefficient of thermal contraction not exceeding 1% when left to stand at a temperature of 130 deg. C. for 30 minutes. The shock absorbing member preferably has a water absorbing power of eight times.

According to a salient feature of this invention, the shock absorbing member is a strand of e.g. yarn not absorbing water, but carrying a water-absorbing resin. The yarn not absorbing water is a material of high density having a low coefficient of thermal contraction. Thus, the shock absorbing member in the optical fiber cable of this invention does not undesirably contract under heat and tighten the core. Therefore, it does not bring about any increase of transmission loss by optical fiber, while it is capable of absorbing water satisfactorily to protect the cable from any moisture.

BEST MODE OF CARRYING OUT THE INVENTION

Figure 1:
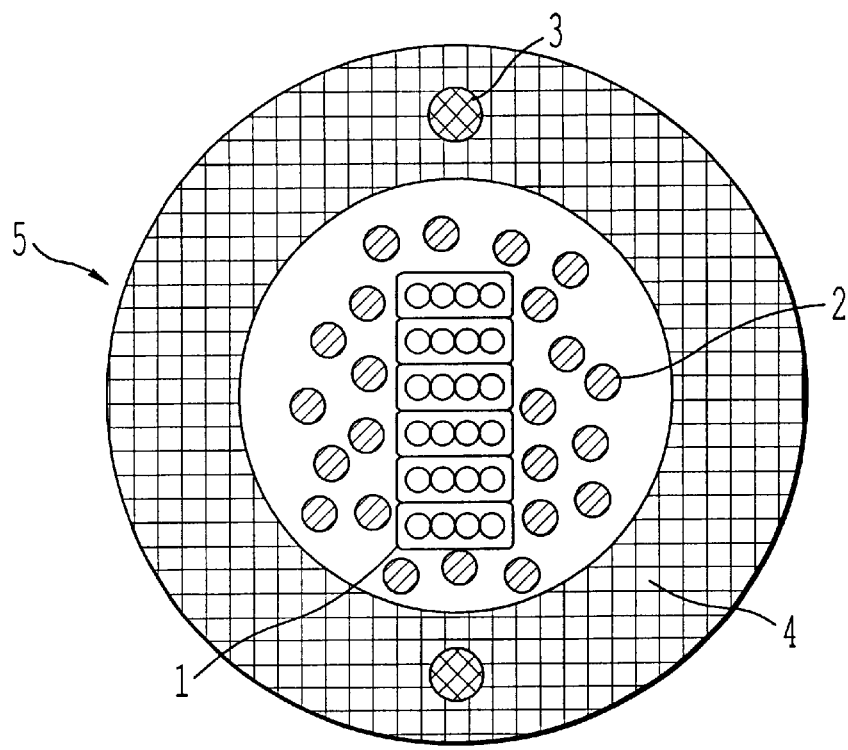
FIG. 1 is a cross-sectional view of an optical fiber cable embodying this invention.

The invention will now be described in further detail with reference to the drawings. FIG. 1 shows the cross-sectional construction of an optical fiber cable embodying this invention. The cable 5 includes a stack of six ribbons of four-fiber cores 1 and a shock absorbing member 2 surrounding it. The shock absorbing member 2 is formed by a strand of yarn of shock absorbing material not absorbing water, but having a thermal contraction coefficient of 0.2% when left to stand at a temperature of 130 deg. C. for 30 minutes. It carries a water-absorbing polymer, such as polyacrylate or polyvinyl alcohol, bonded to it by an adhesive, and has a water absorbing power of eight times. The water-absorbing polymer can be bonded to the shock absorbing material by, for example, coating its surface with a mixture of adhesive and polymer, or spraying the mixture against its surface. The strand may be of, for example, polypropylene or nylon yarn, or carbon yarn known by the trademark Kevlar.

The stack of cores 1 and the shock absorbing member 2 surrounding it form a cable core assembly. The cable 5 further includes two members 3 of high tensile strength extending along the core assembly, and the core assembly and the high-tensile members 3 are enclosed in a sheath 4 formed from e.g. a thermoplastic resin. Steel wires can, for example, be used as the high-tensile members 3.

The water absorbing power of the shock absorbing member 2 can be determined by leaving it immersed in purified water for 10 minutes, leaving it to stand in an atmosphere having an ordinary temperature for 10 minutes, measuring its weight and comparing it with its original weight. Water is preferably removed from the surface of the sample by means of e.g. a metallic sieve before it is left to stand in an atmosphere having an ordinary temperature.

EXAMPLE

Figure 2:
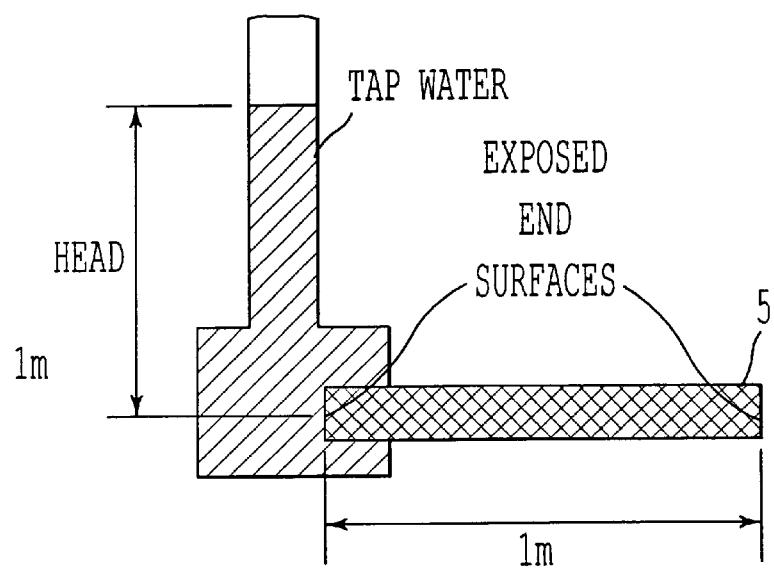
FIG. 2 is a diagram illustrating a waterproofness test.
Figure 3:
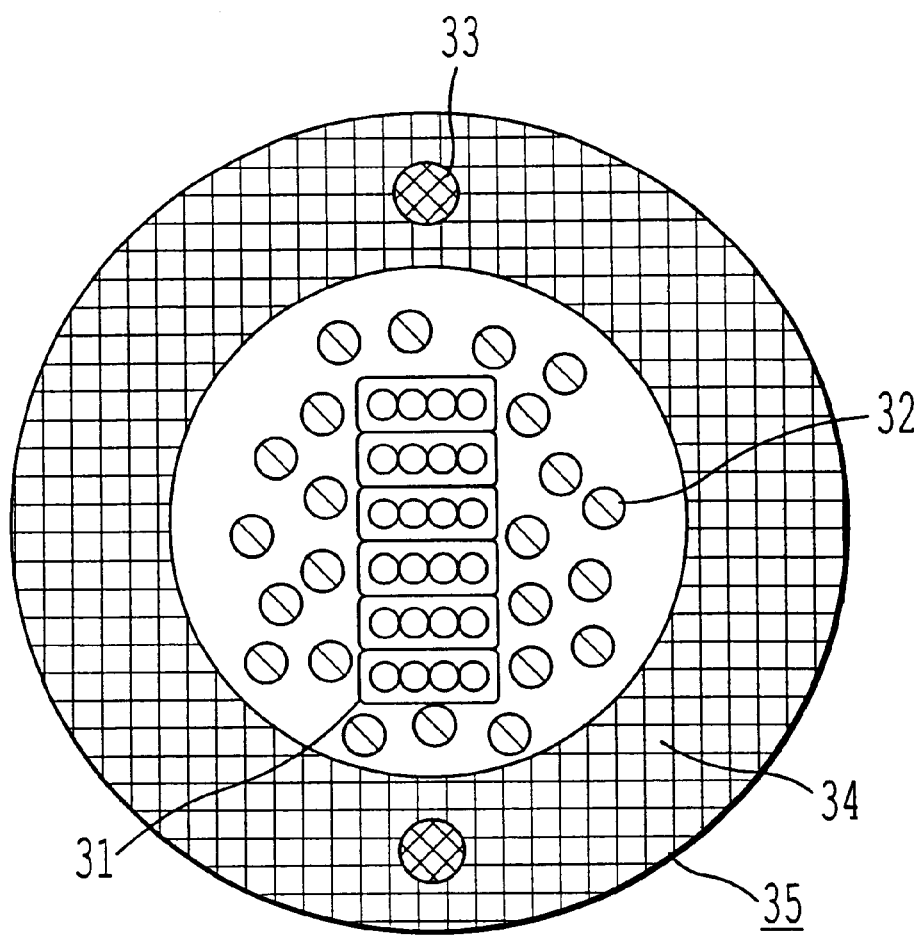
FIG. 3 is a cross-sectional view of a known optical fiber cable.

Description will now be made of a specific example of optical fiber cable prepared by the inventor on a trial basis. Polypropylene yarn was used to make a strand of material not absorbing water for the shock absorbing member 2. A polyacrylate resin was used as the water-absorbing resin. The polymer was caused by an adhesive to adhere to the surface of each individual polypropylene yarn and a strand having a fineness of 2,000 to 10,000 deniers was formed from a bundle of such polypropylene yarn. Six to ten such strands were prepared and wound about a stack of six ribbons of four-fiber cores 1 to prepare a cable core assembly, as shown in FIG. 1. Each ribbon of optical fiber cores 1 had a thickness of 0.3 mm and a width of 1.1 mm. The core assembly and two members 3 of high tensile strength were enclosed in a sheath 4 to make an optical fiber cable 5, as shown in FIG. 1. The sheath 4 had an outside diameter of 10 mm defining the outside diameter of the cable 5 and an inside diameter of 4.5 mm defining the outside diameter of the core assembly. The cable 5 was tested for transmission loss and waterproofness. No increase of transmission loss was observed. A waterproofness test was conducted by using tap water at a head of 1 mm for 24 hours in a known way as shown in FIG. 2, and gave a water run not exceeding 1 m. This result confirmed that no problem would occur from the practical use of the cable according to this invention.

While the invention has been described by way of its preferred embodiment and example, it is to be understood that variations or modifications may be easily made without departing from the spirit and scope of this invention. For example, it will be easy to think of employing only a single member of high tensile strength, or three or more such members instead of two.

This invention essentially resides in a shock absorbing member comprising a strand of e.g. yarn of a shock absorbing material not absorbing water, and carrying a water-absorbing resin, such as polyacrylate or polyvinyl alcohol. It is, of course, possible to use any other water-absorbing resin.

Although each ribbon of optical fiber cores has been described and shown as containing four fibers, it is possible to use a ribbon containing a different number of fibers, too. While each core has been described and shown as being in the form of a ribbon, it is possible to use a core in any other form, too, including a single optical fiber. Although the shock absorbing member 2 has been described as being wound about a stack of cores, it is also applicable in any other form covering the cores. Although the cable core assembly has been described as including a stack of ribbons surrounded by the shock absorbing member 2, it is equally possible to use a single ribbon, or fiber surrounded by a shock absorbing member 2.

Industrial Utility:

The optical fiber cable of this invention is suitable as a cable for fiber-optic communications in which it is necessary to restrain any increase of transmission loss, since its shock absorbing member does not contract under heat to exert any undesirable tightening force on its fiber cores.

What is claimed is:

1. An optical fiber cable comprising a core assembly formed by surrounding an optical fiber core or cores by a shock absorbing member, at least one member of high tensile strength extending along the core assembly, and a sheath enclosing the core assembly and the high-tensile member, wherein the shock absorbing member comprises a strand of shock absorbing material not absorbing water, but carrying a water-absorbing resin.

2. The cable according to claim 1, wherein the strand of shock absorbing material is a yarn not absorbing water.

3. The cable according to claim 2, wherein the strand is mainly of polypropylene, nylon or carbon yarn.

4. The cable according to claim 2, wherein the resin is a water-absorbing polymer bonded to the shock absorbing material by an adhesive.

5. The cable according to claim 2, wherein the shock absorbing material has a coefficient of thermal contraction not exceeding 1% when left to stand at a temperature of 130 deg. C. for 30 minutes.

6. The cable according to claim 5, wherein the shock absorbing member has a water absorbing power which enables it to reach a weight which is eight times larger than its original weight.

* * * * *

UNITED STATES PATENT AND TRADEMARK OFFICE
CERTIFICATE OF CORRECTION

PATENT NO. : 6,694,078 B2
DATED : February 17, 2004
INVENTOR(S) : Yasutomi et al.

It is certified that error appears in the above-identified patent and that said Letters Patent is hereby corrected as shown below:

Title page,
Item [30], Foreign Application Priority Data, should read:
-- [30]     Foreign Application Priority Data
    Jun. 1, 2000     (JP) ..................... 2000-164926 --

Signed and Sealed this

Twenty-seventh Day of April, 2004

JON W. DUDAS
*Acting Director of the United States Patent and Trademark Office*